(12) United States Patent
Berry

(10) Patent No.: US 12,723,998 B2
(45) Date of Patent: Sep. 1, 2026

(54) HUMIDITY SENSOR WITH IMPROVED CONTAMINANT SEALING

(71) Applicant: DWYER INSTRUMENTS, LLC, Michigan City, IN (US)

(72) Inventor: Jason Robert Berry, Michigan City, IN (US)

(73) Assignee: DWYER INSTRUMENTS, LLC, Michigan City, IN (US)

( * ) Notice: Subject to any disclaimer, the term of this patent is extended or adjusted under 35 U.S.C. 154(b) by 531 days.

(21) Appl. No.: 18/293,787

(22) PCT Filed: Jan. 17, 2022

(86) PCT No.: PCT/US2022/012655
§ 371 (c)(1),
(2) Date: Jan. 31, 2024

(87) PCT Pub. No.: WO2022/155562
PCT Pub. Date: Jul. 21, 2022

(65) Prior Publication Data

US 2024/0230574 A1 Jul. 11, 2024

Related U.S. Application Data

(60) Provisional application No. 63/137,792, filed on Jan. 15, 2021.

(51) Int. Cl.
*G01N 27/22* (2006.01)

(52) U.S. Cl.
CPC ......... *G01N 27/226* (2013.01); *G01N 27/225* (2013.01)

(58) Field of Classification Search
None
See application file for complete search history.

(56) References Cited

U.S. PATENT DOCUMENTS 11,079,347 B1 * 8/2021 Beasley ................. G08B 21/20
2005/0130210 A1 * 6/2005 Peck .................... G01N 27/225 435/6.19

(Continued)

FOREIGN PATENT DOCUMENTS

EP 2261572 A1 12/2010
GB 2178539 A 2/1987

OTHER PUBLICATIONS

PCT International Search Report for corresponding International Application Serial No. PCT/US2022/012655, mailed Apr. 25, 2022, pp. 1-21.

*Primary Examiner* — Stephanie E Bloss
*Assistant Examiner* — Diana Hancock
(74) *Attorney, Agent, or Firm* — Tarolli, Sundheim, Covell & Tummino LLP

(57) ABSTRACT

An apparatus for measuring humidity of air flowing in a conduit includes a probe comprising a probe arm configured to be inserted into the conduit. A humidity sensor element is disposed at a distal end of the probe arm. A filter is connectable with the probe arm to enclose the humidity sensor element. The filter includes a filter housing that defines an interior in which the humidity sensor element is disposed, and an opening that provides fluid communication between the interior and exterior of the filter housing. The filter further includes a filter membrane that spans the opening. The filter membrane is constructed of a hydrophobic material that allows air and water vapor to pass freely through its structure from the exterior to the interior, and that blocks liquid water and particulates from passing through its structure from the exterior to the interior.

14 Claims, 4 Drawing Sheets

(56) References Cited

U.S. PATENT DOCUMENTS

| | | | | |
|---|---|---|---|---|
| 2009/0211357 | A1* | 8/2009 | Pinto | G01D 11/245 73/866.5 |
| 2009/0288484 | A1 | 11/2009 | Selvan et al. | |
| 2019/0072507 | A1* | 3/2019 | Jahn | G01N 25/66 |

* cited by examiner 10
20
40
60
80

10
20
40
44
42
50
60
80

HUMIDITY SENSOR WITH IMPROVED CONTAMINANT SEALING

RELATED APPLICATION

This application claims the benefit of U.S. Provisional Application Ser. No. 63/137,792, filed on Jan. 15, 2021, the disclosure of which is hereby incorporated by reference in its entirety.

TECHNICAL FIELD

This disclosure relates to humidity sensors. In particular, this disclosure relates to HVAC duct mounted humidity sensors including a probe that is inserted into the ductwork to measure the humidity of the air flowing therethrough.

BACKGROUND

Humidity sensors are one of the most common types of sensors used for heating, ventilation, and air conditioning (HVAC) equipment and building management systems. With proper humidity monitoring, energy efficiency of a building can be improved. By using environmental conditions in conjunction with an economizer to reduce the building load, cool outside air is used to cool the indoor space of a building. Dampers, humidity sensors, and temperature sensors are used to verify optimal outdoor conditions for maximizing energy cost savings. Humidity sensors therefore play an important role in economizer systems.

Although there are various types of humidity sensors, the most common type of humidity sensor used in HVAC instrumentation is the capacitance polymer humidity sensor. In these types of humidity sensors, a small capacitor constructed of a hygroscopic dielectric material, or polymer, is placed between a pair of electrodes, which allow for measuring or otherwise producing a signal indicative of the capacitance of the humidity sensor. Humidity is determined as a function of the capacitance of the sensor.

There is a direct relationship between the relative humidity in the air, the amount of moisture in the sensor, and the sensor capacitance. Because of this relationship, the capacitance of the humidity sensor varies at a rate that is related to the change in relative humidity. The dielectric polymer material of the humidity sensor can absorb humidity from the air in which it is disposed. When no moisture is present in the sensor, the polymer dielectric constant and the sensor geometry determine the value of the sensor's capacitance. As the sensor absorbs moisture, its capacitance increases. As moisture evaporates from the sensor back into the air, its capacitance decreases.

One particular application in which humidity is measured involves measuring the relative humidity of air flowing through ducts in an HVAC system. Within this application, duct-mounted humidity sensors include an electronics enclosure or housing that is surface mounted to an exterior of the HVAC duct. A tubular probe extends from the electronics enclosure through the duct sidewall and into the duct. The probe supports a relative humidity sensor at its distal end, which is positioned in the flow path of the duct when the sensor is installed. Wiring connecting the humidity sensor to electronics in the enclosure pass through the tubular probe.

The air flowing through the duct in which the relative humidity sensor probe is installed is exposed to dust, dirt, and other particles in the air. The sensor probe can also be exposed to liquid water, i.e., water droplets, in the air. Particulates, such as dust, dirt, and other solid debris can collect on the sensor and can clog the distal end of the tubular probe. Liquid water can also collect on the probe and mix with the particulates, resulting in a further collection of contaminants on the sensor and in the probe, and can eventually clog the distal end of the sensor probe.

SUMMARY

An apparatus for measuring humidity of air flowing in a conduit includes a probe comprising a probe arm configured to be inserted into the conduit. A humidity sensor element is disposed at a distal end of the probe arm. A filter is connectable with the probe arm to enclose the humidity sensor element. The filter includes a filter housing that defines an interior in which the humidity sensor element is disposed, and an opening that provides fluid communication between the interior and exterior of the filter housing. The filter further includes a filter membrane that spans the opening. The filter membrane is constructed of a hydrophobic material that allows air and water vapor to pass freely through its structure from the exterior to the interior, and that blocks liquid water and particulates from passing through its structure from the exterior to the interior.

According to a first aspect, the filter membrane can be constructed of a porous, sintered PTFE membrane material.

According to a second aspect, alone or in combination with any other aspect, the filter housing can be cylindrical, the opening can be circular, and the filter membrane can have a flat, disc-shaped configuration.

According to a third aspect, alone or in combination with any other aspect, the filter housing can include a distal portion in which the filter membrane is disposed. The distal portion of the filter housing can include an annular shoulder portion against which the filter membrane is positioned.

Additionally, according to the third aspect, the filter can also include an O-ring that engages the filter membrane and urges the membrane against the shoulder portion of the filter housing.

Additionally, according to the third aspect, the filter housing can include an annular recess for receiving the O-ring and positioning the O-ring adjacent the filter membrane. The filter housing can be configured so that installation of the O-ring required the O-ring to be deflected and so that, once installed, resilient material qualities of the O-ring causes the O-ring to engage the annular edge portion of the filter membrane and urge the filter membrane against the shoulder portion of the filter housing.

Additionally, according to the third aspect, the O-ring can be constructed of a hydrophobic material so as to form a hydrophobic seal that extends from the filter housing, across the O-ring and the interface between the O-ring and the filter membrane, and across the filter membrane itself. According to this aspect, the O-ring and filter membrane are constructed of a PTFE material.

Additionally, according to the third aspect, the shoulder portion of the filter housing can include an annular end surface against which an annular edge portion of the filter membrane is positioned. An inner surface of the filter housing can intersect the end surface at an acute angle to form an annular corner of the shoulder portion. The filter membrane, in an assembled condition of the filter, can be urged into engagement with the annular corner and deflected to bend at the annular corner so that the annular edge portion of the filter membrane engages the end surface of the shoulder portion.

Additionally, according to this aspect, the filter can also include an O-ring that engages the filter membrane and urges the membrane into engagement with the annular corner.

Additionally, according to this aspect, the engagement between the filter membrane and the annular corner and the deformation of the filter membrane around the annular corner can lock the membrane in place on the shoulder portion and enhances the sealing of the membrane against the annular end surface.

Additionally, according to the third aspect, the distal portion of the filter can include a collar portion for receiving the filter membrane. The collar portion can include the shoulder portion.

Additionally, according to the third aspect, the filter housing can be configured to position the filter membrane in a recess at the distal end of the filter housing. Additionally, according to this aspect, the filter can be configured to orient the filter membrane in the recess with its planar surface parallel to the airstream when installed in the conduit. Additionally, according to this aspect, the recess can be configured so that the airflow in the conduit creates a vacuum at an outer surface of the filter membrane.

According to a fourth aspect, the filter membrane can be constructed of a porous, sintered PTFE membrane material.

According to a fifth aspect, the filter can included an end-cap for enclosing the sensor element at the end of the probe arm. The filter housing can also include a socket with an internal tapered bore configured to permit the insertion of the terminal end of the probe arm. The filter housing can include internal threads adjacent the socket. The probe arm comprises external threads on a terminal end of the probe arm. An O-ring can be fitted into an annular groove in the probe arm adjacent the external threads. The internal threads of the filter can engage internal threads on the filter housing, which permits the filter to be screwed onto the probe arm. The O-ring can be compressed by the tapered bore to form a seal between the filter housing and the probe arm when the filter is screwed onto the probe arm.

According to a sixth aspect, the filter can be constructed to have IP ratings of IP64, IP65, and IP68.

DRAWINGS

DESCRIPTION

Figure 1:
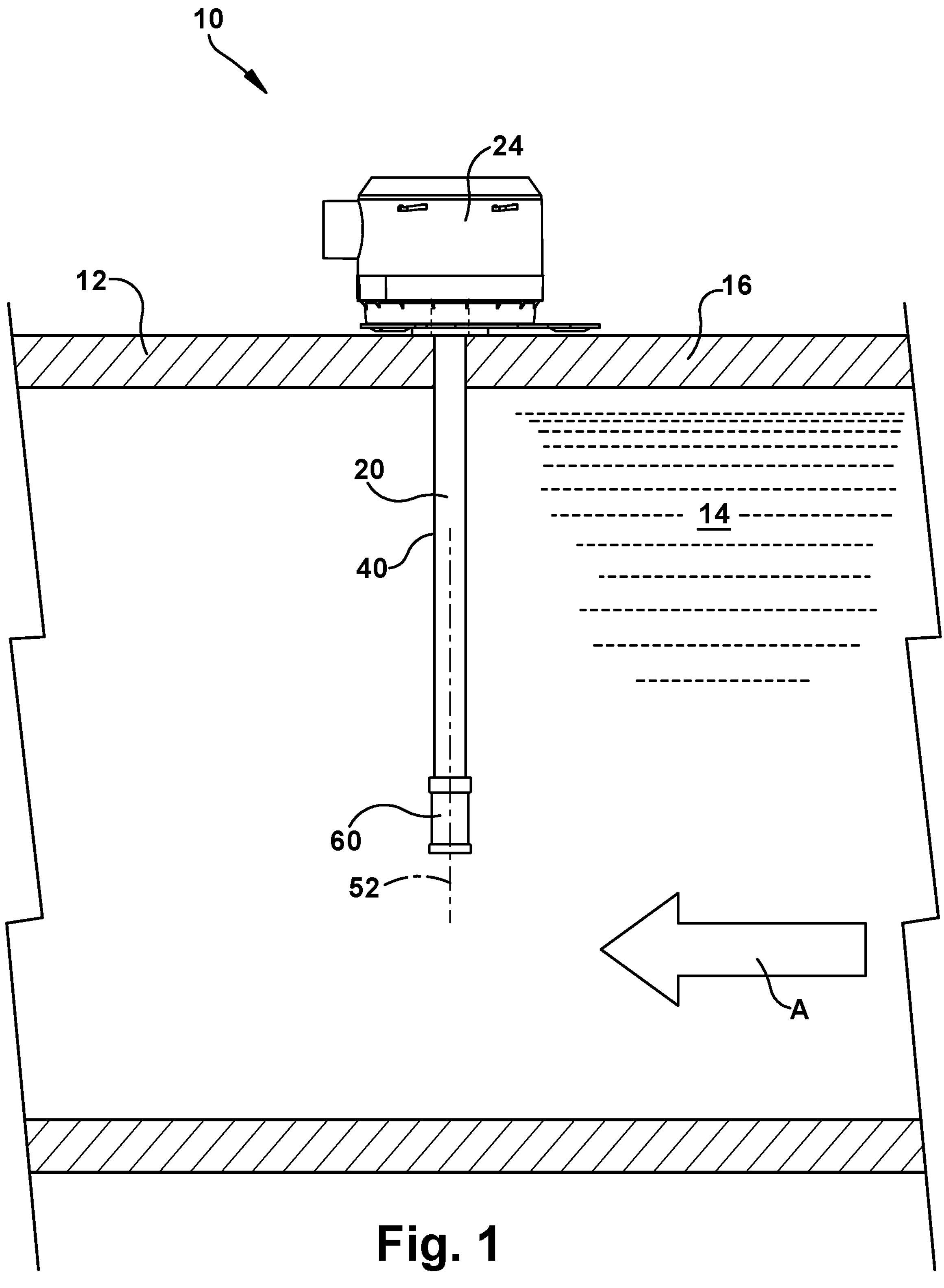
FIG. 1 is a side view illustrating an installed condition of a humidity sensor according to one example configuration.

Referring to FIG. 1, an apparatus 10, referred to herein as a humidity sensor, measures the humidity of a fluid 14 flowing through a conduit 12, such as ductwork in an HVAC system. In some configurations, the humidity sensor 10 can also include components for measuring the temperature of the fluid 14 flowing through the conduit 12. FIG. 1 is an example illustration and the relative scales or sizes of the various components depicted therein may or may not be accurate or drawn to scale. The fluid 14 in the conduit flows in a flow direction indicated generally by the arrow labeled "A" in FIG. 1.

Figures 2, 3:
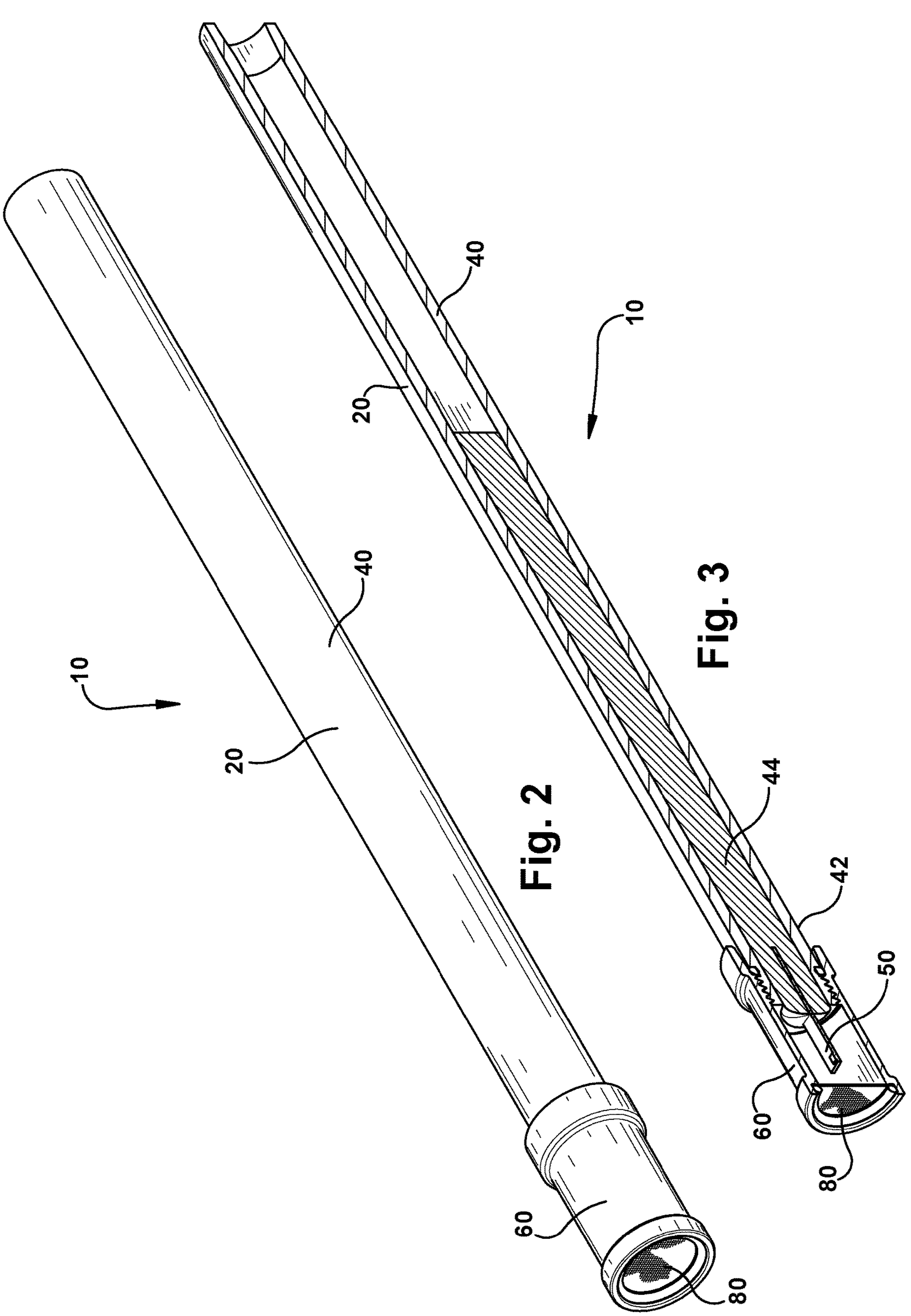
FIG. 2 is a perspective view of a probe and a sensor head portion of the humidity sensor.
FIG. 3 is a perspective sectional view of the probe and a sensor head portion of the humidity sensor illustrated in FIG. 2.

Referring to FIGS. 1-3, according to the illustrated example configuration, the humidity sensor 10 includes an electronics housing or enclosure 24 that is configured to be mounted on an exterior wall 16 of the conduit 12. A probe 20 extends from the electronics enclosure 24 and extends transversely, e.g., perpendicularly, through the conduit wall 16 into the fluid 14 flowing in the conduit 12.

The probe 20 includes a probe arm 40 having an elongated (cylindrical) tubular configuration and a humidity sensor element 50 supported at the distal end of the probe arm. The probe 20 is inserted into the conduit 12 so as to position the sensor element 50 at a desired position in the conduit. The length of the probe arm 40 can be selected to position the sensor element 50 at the desired position in the conduit 12 when the humidity sensor 10 is installed. The electronics enclosure 24 includes electronics for interrogating the sensor element 50 via wiring (not shown) extending through the probe arm 40 in order to obtain a signal indicative of the level of humidity in the fluid 14 flowing through the conduit 12. The electronics unit 24 produces an output (wired and/or wireless) for transmitting a signal indicative of the measured humidity.

The precise type and configuration of the probe 20 and electronics enclosure 24 is not important, as long as they can accommodate the structural and operational aspects of the humidity sensor 10 described herein.

As shown in FIG. 3, the sensor element 50 projects from the terminal end 42 of the probe arm 40. The sensor element 50 can be supported at the terminal end 42 by a variety of means, such as a potting material 44. The potting material 44 both supports the sensor element 50 at the terminal end 42 and provides an effective seal that prevents contaminants from entering the interior of the probe arm 40. The sensor element 50 can be supported at the end of a printed circuit board (flexible, rigid, or a combination thereof) that extends through the probe arm 40 from the electronics in the enclosure 24 through the potting material 44. Alternative connections between the electronics in the enclosure 24 and the sensor element, such as wiring, can also be implemented.

The humidity sensor 10 also includes a filter 60 for filtering contaminants, such as particulates and liquid water from the air from which the sensor element 50 measures humidity. The filter 60 acts as an end-cap for enclosing the sensor element 50 at the end of the probe arm 40 and can be connected to the terminal end 44 of the probe arm in a variety of manners, such as by screw threads, as shown, or by gluing or otherwise bonding the filter to the probe arm.

Figure 4:
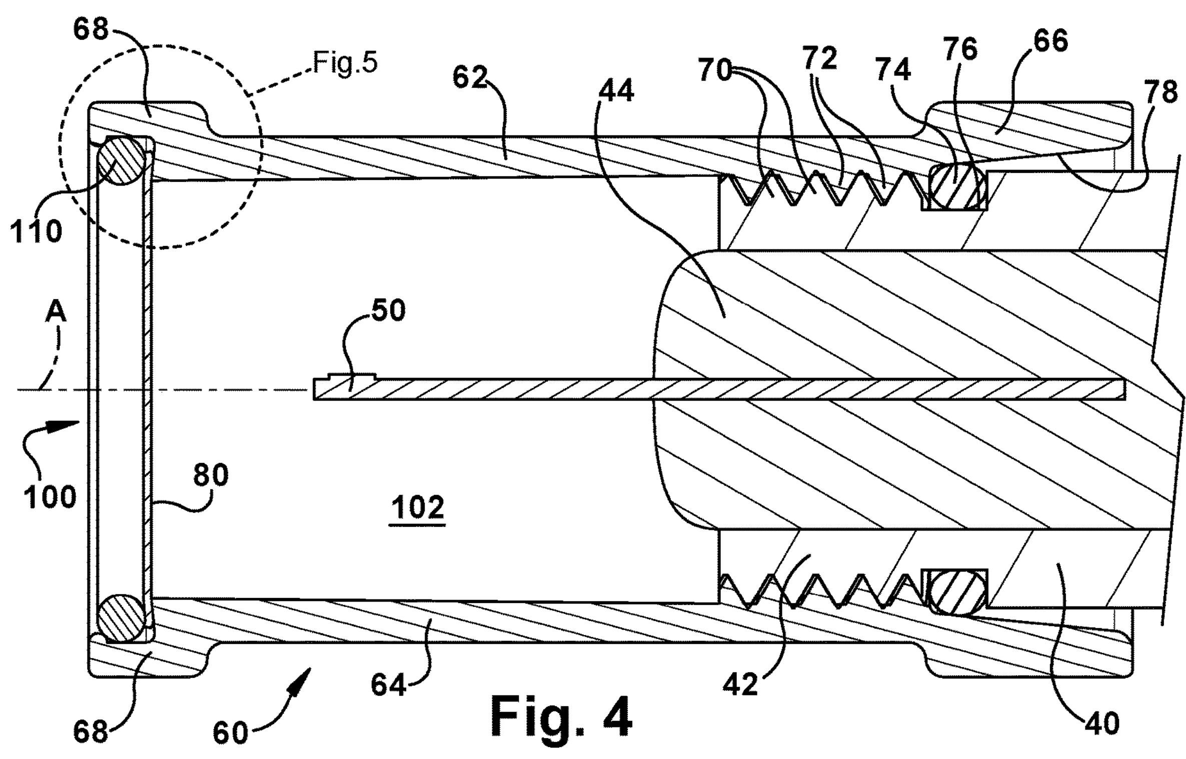
FIG. 4 is a sectional view illustrating the sensor head portion of the humidity sensor.
Figure 5:
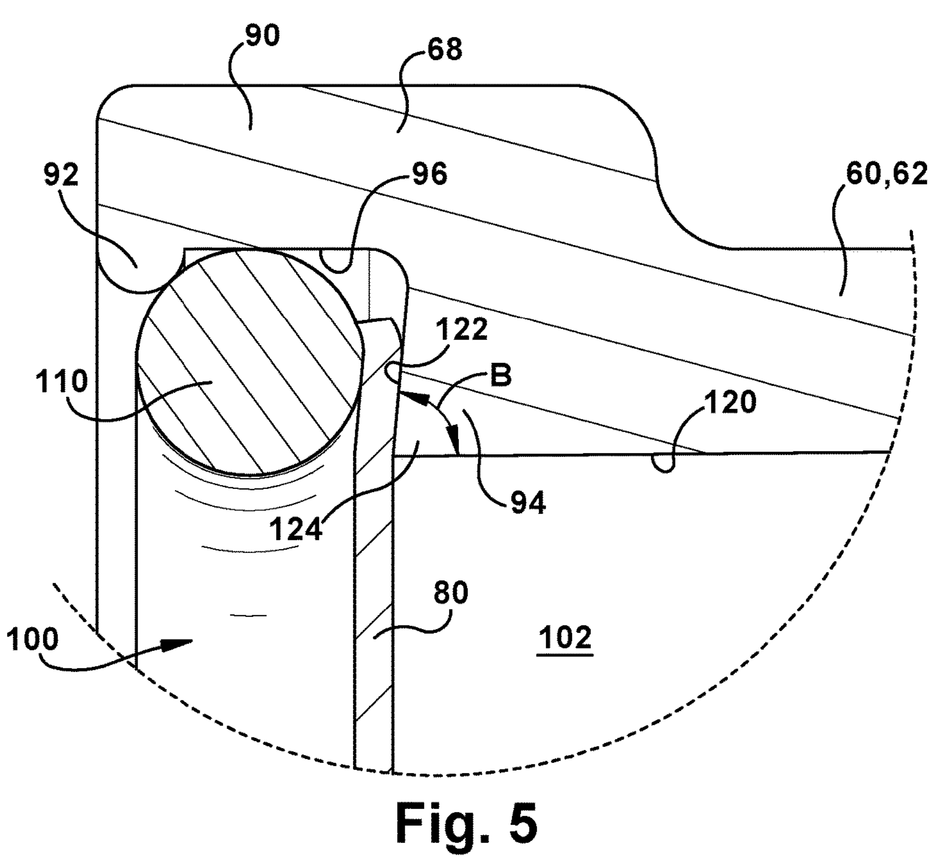
FIG. 5 is an enlarged view of a portion of the sensor head portion of FIG. 4.
Figure 6:
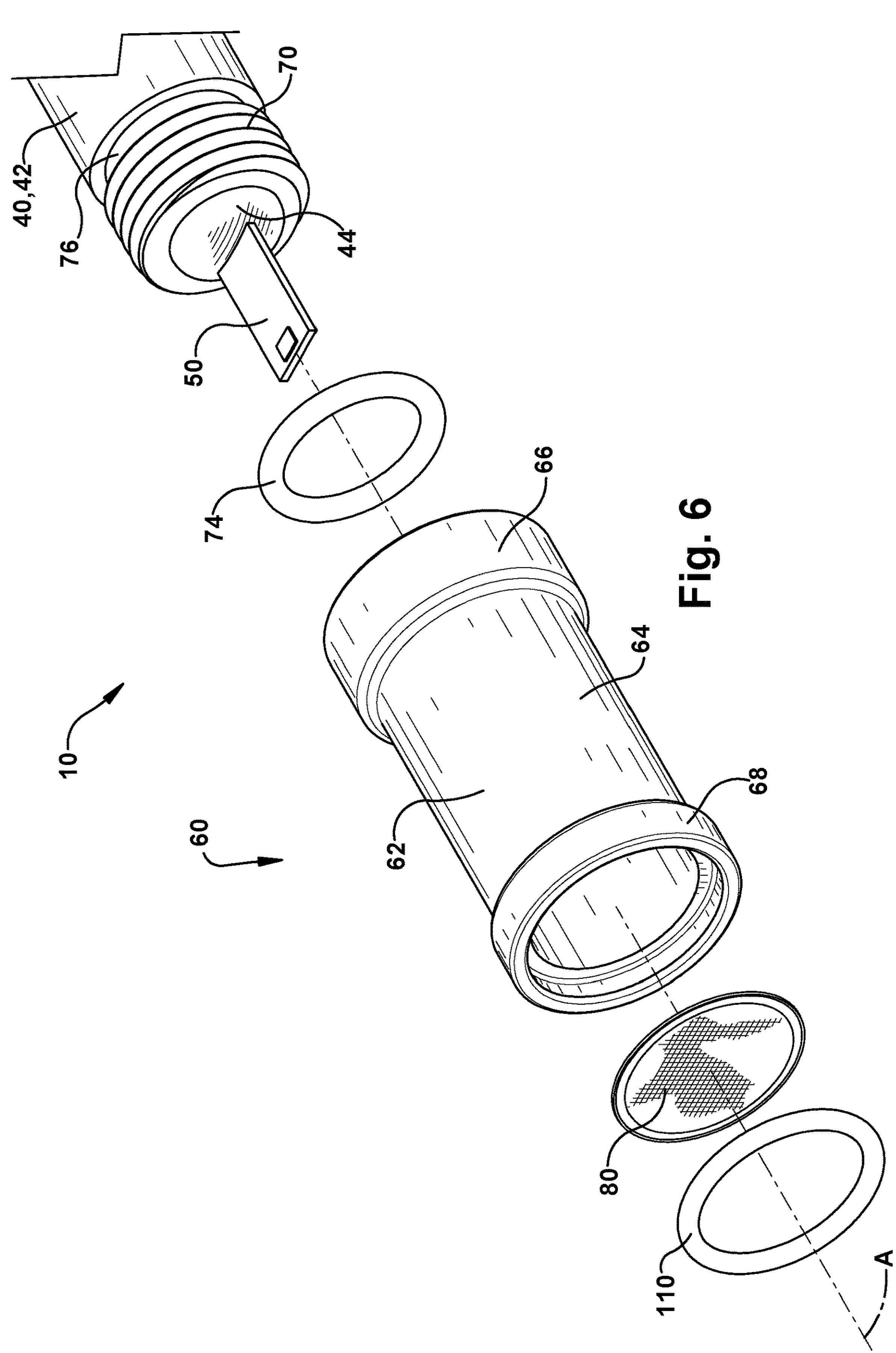
FIG. 6 is an exploded perspective view of the sensor head portion of the humidity sensor.

The construction and assembly of the humidity sensor 10 is further illustrated in FIGS. 4-6. The filter 60 includes a filter housing 62 that has a generally cylindrical configuration and can be constructed of a variety of materials, such as ABS plastic. The filter housing 62 includes a cylindrical main body portion 64, a proximally located socket 66 for receiving the terminal end 42 of the probe arm 40, and a distally located collar 68 for receiving a disc-shaped filter membrane 80. The socket 66 has a diameter that is larger than the main body portion 64, with an internal tapered bore 78 having a tapered diameter configured to permit the insertion of the terminal end 42 of the probe arm 40.

When inserted into the socket 66, external threads 70 on the terminal end 42 of the probe arm 40 engage internal threads 72 on the main body portion 64 of the filter housing 62. An O-ring 74 is fitted into an annular groove 76 in the terminal end 42 of the probe arm 40 adjacent the threads 70 and is compressed by the tapered bore 78 to form a seal between the filter housing 62 and the probe arm when the filter 60 is screwed onto the probe arm. For this purpose, the O-ring 74 can be formed of a material, such as 90A durometer polyurethane, that won't take a compression set and resists abrasion from repeated removal and installation of the filter 60.

The collar portion 68 of the filter housing 62 includes a sidewall 90 that terminates with an annular rim 92 that projects inward from the sidewall. On the interior of the filter housing 62, an annular shoulder 94 is formed at or near the junction of the main body 64 and collar 68 portions of the filter housing. The sidewall 90, rim 92, and shoulder 94 define an annular groove or recess 96 in the collar portion 68 of the filter housing. In an assembled condition of the filter 60, the filter membrane 80 is positioned in the recess 96 against the annular shoulder 94. The filter membrane 80 spans across and covers an opening 100 to an interior 102 of the filter 60 in which the sensor element 50 is disposed.

To secure the filter membrane 80 in the collar 68, an O-ring 110 is installed in the annular recess 98 after the filter membrane is installed. An annular edge portion of the filter membrane 80 rests on the annular shoulder 94. The O-ring 110 is sized and dimensioned to form an interference with the dimensions of the annular recess 98 with the filter membrane 80 installed therein so that its installation requires the O-ring to be deformed and compressed. The O-ring 110, being constructed of a material, such as a rubber or a polymer, is resilient in nature and tends to resume its shape when deformed and compressed. Because of this, the O-ring 110 exerts a force on the filter structure defining the recess 98 and on the filter membrane 80. The force exerted by the O-ring 110 presses the filter membrane 80 against the annular shoulder 94 while, at the same time, forming a seal that prevents contaminants from entering the interior 102 of the filter through the recess 98.

In one particular configuration, the O-ring 110 can be constructed of a Polytetrafluoroethylene (PTFE) material. The PTFE material is hydrophobic, which is advantageous in terms of the O-ring 110 being used to secure and seal the filter membrane 80 in the collar 68. The O-ring 110 and the filter membrane 80 are both constructed of a hydrophobic material (also PTFE, see below), which ensures that the seal itself, formed at the interface between the O-ring and filter membrane, is hydrophobic.

The shoulder 94 is configured so that the filter membrane 80 engages a sharp corner, i.e., and intersection of surfaces, when it is pressed against the shoulder by the O-ring 110. As shown in FIG. 5, the shoulder 94 is formed by and in the area of surfaces 120 and 122 that intersect at an annular corner 124, as best shown in FIG. 5. The surface 120 is a cylindrical inner surface of the main body 64 of the filter housing 62, which at least partially defines the interior 102 of the filter housing. The surface 122 is an annular end surface formed within the collar portion 68 and against which the filter membrane 80 rests.

The surfaces 120, 122 are not orthogonal, i.e., they do not intersect each other at a 90 degree angle. The surface 120 is parallel to the central axis A of the filter, but the surface 122 is not perpendicular to the axis A. Instead, the surface 122 is angled slightly acutely with respect to the axis A and the surface 120, as indicated generally at the angle B in FIG. 5. Because of this, when the O-ring 110 urges the filter membrane 80 against the shoulder 94, i.e., against the surface 122, the filter membrane bends or otherwise deforms around the corner 124. The corner 124 thus engages the filter membrane 80, which locks the membrane in place on the shoulder 94 and enhances the sealing of the membrane against the surface 122 without requiring any additional bonding or support, such as an adhesive.

The filter membrane 80 is constructed of a porous, sintered PTFE membrane material. According to this construction, a PTFE fine powder resin is expanded into a 3-dimensional web-like structure, which creates microscopic pores. The structure is formed into the flat, disc-shaped configuration illustrated in the figures. The filter membrane 80 utilizes inherent hydrophobic and non-stick nature of PTFE to block liquid water from penetrating the membrane and to allow for the removal of particulates captured on the membrane surface.

The specific pore size implemented in the filter membrane can be selected empirically to provide a desired balance between hydrophobic, liquid water blocking ability and the passage of air, which relates directly to sensor response time. This balance allows air to pass through the membrane while blocking particulates and liquid water from entering and passing through the filter membrane 80. In one example configuration, the PTFE filter membrane 80 can be constructed to provide 0.1 micron filtration, with the finished assembly of the filter 60 having the following IP ratings:

IP 64 Dust tight; splashing water protection.

IP 65 Dust tight; water jet protection.

IP 68 Dust tight; immersion Beyond 1 m protection.

From this, it can therefore be seen that the filter 60, constructed with the PTFE filter membrane 80 described herein, can provide a consistent, temperature and chemical compatible barrier, which permits the passage of air and water vapor while blocking liquid water as well as particulates and other contaminants.

Owing to the configuration of the filter 60 described herein, the filter membrane 80 has a recessed position in the collar portion 68. Because of this, the filter membrane 80 is not positioned directly in the airstream (see FIG. 1). The filter membrane 80 is oriented with its planar surface parallel to the airstream and is recessed in the collar portion 68 of the filter 60, which helps to prevent the buildup of contaminants and/or liquid water into the sensor cap. Due to the parallel orientation with respect to the airstream, fluid flow directly into or against the filter membrane 80 is avoided, so that contaminants and/or liquid water is not pushed or thrown directly against the filter membrane. Additionally, the recessed configuration of the filter membrane 80 helps create a mild vacuum in high velocity airflows, which would tend to draw contaminants away from the filter membrane, and thus passively clean the face of filter membrane.

Because air and water vapor can pass freely through the filter membrane 80, the sensor element 50 is exposed to the air in the duct, while particulates/contaminants are blocked from entering the interior 102 of the filter housing 62. Both the O-ring 110 and filter membrane 80 are hydrophobic and, therefore, liquid water cannot ingress to the interior 102 of the filter housing 62 through the opening 100. The filter membrane 80 does, however, allow water vapor to pass through the filter membrane, which allows the sensor element 50 to measure the humidity in the air.

I claim:

1. An apparatus for measuring humidity of air flowing in a conduit, comprising:

- a probe comprising a probe arm configured to be inserted into the conduit;
- a humidity sensor element disposed at a distal end of the probe arm; and
- a filter connectable with the probe arm to enclose the humidity sensor element, the filter comprising a filter housing that defines an interior in which the humidity sensor element is disposed, and an opening that provides fluid communication between the interior and exterior of the filter housing;

wherein the filter further comprises a filter membrane constructed of a hydrophobic material that allows air and water vapor to pass freely through its structure from the exterior to the interior, and that blocks liquid water and particulates from passing through its structure from the exterior to the interior, wherein the filter housing is cylindrical and comprises a distal portion with an annular recess comprising an internal annular shoulder portion that helps define the opening, the filter membrane being positioned in the recess against the annular shoulder and spanning across the opening, wherein the filter further comprises an O-ring that engages the filter membrane and urges the filter membrane against the shoulder portion so that the filter membrane is secured in the distal portion of the filter housing between the O-ring and the annular shoulder portion.

2. The apparatus recited in claim 1, wherein the filter membrane is constructed of a porous, sintered PTFE membrane material.

3. The apparatus recited in claim 1, wherein the opening is circular and the filter membrane has a flat, disc-shaped configuration.

4. The apparatus recited in claim 1, wherein the filter housing is configured so that installation of the O-ring requires the O-ring to be deflected radially inward and so that, once installed, resilient material qualities of the O-ring causes the O-ring to deflect radially outward to engage the annular edge portion of the filter membrane and urge the filter membrane against the shoulder portion of the filter housing.

5. The apparatus recited in claim 1, wherein the O-ring is constructed of a hydrophobic material so as to form a hydrophobic seal that extends from the filter housing, across the O-ring and the interface between the O-ring and the filter membrane, and across the filter membrane itself.

6. The apparatus recited in claim 5, wherein the O-ring and filter membrane are constructed of a PTFE material.

7. The apparatus recited in claim 1, wherein the annular shoulder of the annular recess comprises an annular end surface against which an annular edge portion of the filter membrane is positioned, an inner surface of the filter housing intersecting the end surface at an acute angle to form an annular corner of the shoulder portion, wherein the filter membrane, in an assembled condition of the filter, is urged into engagement with the annular corner and deflected to bend at the annular corner so that the annular edge portion of the filter membrane engages the end surface of the shoulder portion.

8. The apparatus recited in claim 7, wherein the O-ring engages the filter membrane and urges the membrane into engagement with the annular corner.

9. The apparatus recited in claim 7, wherein the engagement between the filter membrane and the annular corner and the deformation of the filter membrane around the annular corner locks the membrane in place on the shoulder portion and enhances the sealing of the membrane against the annular end surface.

10. The apparatus recited in claim 1, wherein the distal portion of the filter comprises a collar portion for receiving the filter membrane, the collar portion comprising the annular recess and the annular shoulder portion.

11. The apparatus recited in claim 1, wherein the filter is configured to orient the filter membrane in the recess with its planar surface parallel to the airstream when installed in the conduit.

12. The apparatus recited in claim 1, wherein the recess is configured so that the airflow in the conduit creates a vacuum at an outer surface of the filter membrane.

13. The apparatus recited in claim 1, wherein the filter is constructed to have IP ratings of IP64, IP65, and IP68.

14. An apparatus for measuring humidity of air flowing in a conduit, comprising:

a probe comprising a probe arm configured to be inserted into the conduit;

a humidity sensor element disposed at a distal end of the probe arm; and a filter connectable with the probe arm to enclose the humidity sensor element, the filter comprising a filter housing that defines an interior in which the humidity sensor element is disposed, and an opening that provides fluid communication between the interior and exterior of the filter housing;

wherein the filter further comprises a filter membrane that spans the opening, the filter membrane being constructed of a hydrophobic material that allows air and water vapor to pass freely through its structure from the exterior to the interior, and that blocks liquid water and particulates from passing through its structure from the exterior to the interior, wherein:

the filter comprises an end-cap for enclosing the sensor element at the end of the probe arm;

the filter housing further comprises a socket with an internal tapered bore configured to permit the insertion of the terminal end of the probe arm, the filter housing comprising internal threads adjacent the socket;

the probe arm comprises external threads on a terminal end of the probe arm;

an O-ring is fitted into an annular groove in the probe arm adjacent the external threads;

the internal threads of the filter housing engaging external threads on the probe arm, which permits the filter to be screwed onto the probe arm, the O-ring being compressed by the tapered bore to form a seal between the filter housing and the probe arm when the filter is screwed onto the probe arm.

* * * * *